United States Patent
De Wolf et al.

(10) Patent No.: US 10,767,074 B2
(45) Date of Patent: Sep. 8, 2020

(54) PROCESS FOR THE MANUFACTURE OF A CROSSLINKABLE COMPOSITION

(71) Applicant: ALLNEX NETHERLANDS B.V., Bergen op Zoom (NL)

(72) Inventors: Elwin Aloysius Cornelius Adrianus De Wolf, Hoogerheide (NL); Ferry Ludovicus Thys, Stevens-Woluwe (BE); Richard Hendrikus Gerrit Brinkhuis, Zwolle (NL); Nicole Mangnus-Verhagen, Vogelwaarde (NL); Antonius Johannes Wilhelmus Buser, Wehl (NL)

(73) Assignee: Allnex Netherlands B.V., Bergen op Zoom (NL)

( * ) Notice: Subject to any disclaimer, the term of this patent is extended or adjusted under 35 U.S.C. 154(b) by 79 days.

(21) Appl. No.: 15/563,952

(22) PCT Filed: Apr. 15, 2016

(86) PCT No.: PCT/EP2016/058427
§ 371 (c)(1),
(2) Date: Oct. 3, 2017

(87) PCT Pub. No.: WO2016/166334
PCT Pub. Date: Oct. 20, 2016

(65) Prior Publication Data
US 2018/0127615 A1 May 10, 2018

(30) Foreign Application Priority Data

Apr. 17, 2015 (NL) ...................... 2014666

(51) Int. Cl.
| | | |
|---|---|---|
| *C09D 167/02* | (2006.01) | |
| *C09D 133/06* | (2006.01) | |
| *C09D 167/06* | (2006.01) | |
| *C08J 3/24* | (2006.01) | |
| *C08L 67/02* | (2006.01) | |
| *C09D 17/00* | (2006.01) | |

(52) U.S. Cl.
CPC .............. *C09D 167/02* (2013.01); *C08J 3/24* (2013.01); *C08L 67/02* (2013.01); *C09D 17/008* (2013.01); *C09D 133/06* (2013.01); *C09D 167/06* (2013.01); *C08J 2367/02* (2013.01); *C08J 2467/02* (2013.01); *C08L 2205/025* (2013.01); *C08L 2312/00* (2013.01)

(58) Field of Classification Search
CPC ........................... C09D 167/02; C09D 167/08
USPC ................................ 524/601, 604
See application file for complete search history.

(56) References Cited

U.S. PATENT DOCUMENTS

| | | | |
|---|---|---|---|
| 2,635,100 | A | 4/1953 | Werntz |
| 2,759,913 | A | 8/1956 | Hulse et al. |
| 4,217,396 | A | 8/1980 | Heckles |
| 4,223,072 | A | 9/1980 | Baney et al. |
| 4,408,018 | A | 10/1983 | Bartman et al. |
| 4,529,487 | A | 7/1985 | Hsu et al. |
| 4,602,061 | A | 7/1986 | Akkerman |
| 4,749,728 | A | 6/1988 | Craun et al. |
| 4,851,294 | A | 7/1989 | Buter et al. |
| 4,871,822 | A | 10/1989 | Brindöpke et al. |
| 4,938,980 | A | 7/1990 | Arciszewski et al. |
| 5,017,649 | A | 5/1991 | Clemens |
| 5,084,536 | A | 1/1992 | Brindöpke et al. |
| 5,959,028 | A | 9/1999 | Brinkhuis |
| 5,973,082 | A | 10/1999 | Elmore |
| 5,990,224 | A | 11/1999 | Raynolds et al. |
| 6,201,048 | B1 | 3/2001 | Raynolds et al. |
| 6,262,169 | B1 | 7/2001 | Helmer et al. |
| 6,265,029 | B1 | 7/2001 | Lewis |
| 6,706,414 | B1 | 3/2004 | Dammann et al. |

(Continued)

FOREIGN PATENT DOCUMENTS

| | | |
|---|---|---|
| CN | 86101015 A | 8/1986 |
| CN | 1309683 A | 8/2001 |

(Continued)

OTHER PUBLICATIONS

Lösungen, Römpp online 4.0, Mar. 1, 2002, with English machine translation.

(Continued)

*Primary Examiner* — Jane L Stanley
(74) *Attorney, Agent, or Firm* — Hoyng Rokh Monegier LLP; David P. Owen

(57) ABSTRACT

The invention relates to a process for the preparation of a RMA crosslinkable composition comprising at least one crosslinkable component comprising reactive components A and B each comprising at least 2 reactive groups wherein the at least 2 reactive groups of component A are acidic protons C—H in activated methylene or methine groups and the at least 2 reactive groups of component B are activated unsaturated groups C=C and base catalyst C and one or more N—H group containing reactivity moderating component D that are also a Michael addition donor reactable with component B under the action of catalyst C, characterized in that the one or more reactivity moderating components D have a melting temperature above 60° C. and is first dissolved in one or more crosslinkable components comprising reactive components A or B and the obtained pre-dissolved product is later mixed with other components of the RMA crosslinkable composition.

13 Claims, No Drawings

(56) References Cited

U.S. PATENT DOCUMENTS

| | | | |
|---|---|---|---|
| 6,878,845 B2 | 4/2005 | Sheridan | |
| 6,989,459 B2 | 1/2006 | Walker | |
| 7,524,435 B2 | 4/2009 | Bernhard | |
| 7,851,530 B2 | 12/2010 | Brinkhuis et al. | |
| 8,013,068 B2 | 9/2011 | Beckley et al. | |
| 8,124,688 B2 | 2/2012 | Meijer et al. | |
| 8,569,440 B2 | 10/2013 | Spyrou et al. | |
| 8,829,151 B2 | 9/2014 | Meijer et al. | |
| 8,962,725 B2 | 2/2015 | Brinkhuis et al. | |
| 9,181,452 B2 | 11/2015 | Brinkhuis | |
| 9,181,453 B2 | 11/2015 | Brinkhuis | |
| 9,260,626 B2 | 2/2016 | Brinkhuis | |
| 9,284,423 B2 | 3/2016 | Brinkhuis | |
| 9,534,081 B2 | 1/2017 | Brinkhuis | |
| 9,587,138 B2 | 3/2017 | Brinkhuis et al. | |
| 9,834,701 B2 | 12/2017 | Brinkhuis et al. | |
| 10,017,607 B2* | 7/2018 | Brinkhuis | C09D 167/02 |
| 10,604,622 B2* | 3/2020 | Brinkhuis | C08G 63/181 |
| 2003/0023108 A1 | 1/2003 | Walker | |
| 2003/0195305 A1 | 10/2003 | Kuo et al. | |
| 2004/0072979 A1 | 4/2004 | Sheridan et al. | |
| 2005/0137275 A1 | 6/2005 | Nefzger et al. | |
| 2005/0143575 A1 | 6/2005 | Bernard | |
| 2006/0078742 A1 | 4/2006 | Kauffman et al. | |
| 2007/0173602 A1 | 7/2007 | Brinkman et al. | |
| 2007/0299206 A1 | 12/2007 | Cooper et al. | |
| 2009/0143528 A1 | 6/2009 | Mestach et al. | |
| 2009/0226729 A1 | 9/2009 | Niimoto et al. | |
| 2011/0003937 A1 | 1/2011 | Kontani | |
| 2011/0251338 A1 | 10/2011 | Kim et al. | |
| 2013/0053505 A1 | 2/2013 | Brinkhuis et al. | |
| 2013/0210986 A1 | 8/2013 | Brinkhuis et al. | |
| 2013/0317156 A1 | 11/2013 | Yu | |
| 2014/0088233 A1 | 3/2014 | Kann | |
| 2014/0221542 A1* | 8/2014 | Brinkhuis | C08J 3/24 524/389 |
| 2014/0228507 A1 | 8/2014 | Brinkhuis et al. | |
| 2016/0060389 A1* | 3/2016 | Brinkhuis | C08G 63/916 524/604 |
| 2016/0115344 A1 | 4/2016 | Brinkhuis et al. | |
| 2018/0134913 A1* | 5/2018 | De Wolf | C09D 167/08 |
| 2018/0163081 A1* | 6/2018 | Goedegebuure | C08J 3/24 |
| 2018/0163083 A1* | 6/2018 | Brinkhuis | C09D 5/00 |
| 2018/0251656 A1* | 9/2018 | Goedegebuure | C08J 3/24 |
| 2018/0282477 A1* | 10/2018 | Brinkhuis | C08G 63/916 |

FOREIGN PATENT DOCUMENTS

| | | |
|---|---|---|
| CN | 1637031 A | 7/2005 |
| CN | 1723242 A | 1/2006 |
| CN | 1757656 A | 4/2006 |
| CN | 1816597 A | 8/2006 |
| CN | 1910234 A | 2/2007 |
| CN | 1964997 A | 5/2007 |
| CN | 1976972 A | 6/2007 |
| CN | 101012291 A | 7/2007 |
| CN | 101012291 A | 8/2007 |
| CN | 101103060 A | 1/2008 |
| CN | 101107289 A | 1/2008 |
| CN | 101213230 A | 7/2008 |
| CN | 101268149 A | 9/2008 |
| CN | 101869844 A | 10/2010 |
| CN | 101879457 A | 11/2010 |
| CN | 102834436 A | 12/2012 |
| CN | 102834437 A | 12/2012 |
| CN | 103562328 A | 2/2014 |
| CN | 103974999 A | 8/2014 |
| DE | 835809 A | 4/1952 |
| DE | 835809 B | 4/1952 |
| DE | 3041223 A1 | 5/1981 |
| EP | 0161697 A1 | 11/1985 |
| EP | 0192304 A1 | 8/1986 |
| EP | 0198519 A1 | 10/1986 |
| EP | 227454 A2 | 7/1987 |
| EP | 0227454 A2 | 7/1987 |
| EP | 0161697 B1 | 3/1988 |
| EP | 0310011 A1 | 9/1988 |
| EP | 0310011 A1 | 4/1989 |
| EP | 0326723 A1 | 8/1989 |
| EP | 0448154 A1 | 9/1991 |
| EP | 0501223 A2 | 9/1992 |
| EP | 0651023 A2 | 5/1995 |
| EP | 0808860 A2 | 11/1997 |
| EP | 1541606 A1 | 12/2004 |
| EP | 1513900 A1 | 3/2005 |
| EP | 1541606 A1 | 6/2005 |
| EP | 1593727 A1 | 11/2005 |
| EP | 1761582 | 1/2006 |
| EP | 1513900 B1 | 2/2006 |
| EP | 1640388 A2 | 3/2006 |
| EP | 1641887 A1 | 4/2006 |
| EP | 1641888 A1 | 4/2006 |
| EP | 1838747 | 7/2006 |
| EP | 1761582 A1 | 3/2007 |
| EP | 1813630 A2 | 8/2007 |
| EP | 1838747 A1 | 10/2007 |
| EP | 1902081 A1 | 3/2008 |
| EP | 2072520 A1 | 6/2009 |
| EP | 1813630 B1 | 3/2010 |
| EP | 2374836 A1 | 4/2010 |
| EP | 1641887 B1 | 10/2010 |
| EP | 1902081 B1 | 12/2010 |
| EP | 2374836 A1 | 10/2011 |
| EP | 1641888 B1 | 2/2012 |
| EP | 2556108 A1 | 2/2013 |
| EP | 2556108 B1 | 7/2014 |
| EP | 2764035 A1 | 8/2014 |
| EP | 3085748 A1 | 10/2016 |
| GB | 2010879 A | 7/1979 |
| GB | 1596638 A | 8/1981 |
| GB | 2093472 A | 9/1982 |
| GB | 2010879 A | 7/1997 |
| GB | 2405149 A | 2/2005 |
| JP | 53141369 A | 12/1978 |
| JP | 62-223204 A | 10/1987 |
| JP | 01204919 A | 8/1989 |
| JP | H01204919 A | 8/1989 |
| JP | 8501124 A | 2/1996 |
| JP | 8319437 A | 12/1996 |
| JP | 1045993 A | 2/1998 |
| JP | H1045993 A | 2/1998 |
| JP | 10330690 A | 12/1998 |
| JP | H10330690 A | 12/1998 |
| JP | 2000119353 A | 4/2000 |
| JP | 2001-207631 A | 8/2001 |
| JP | 2001516787 A | 10/2001 |
| JP | 2001516789 A | 10/2001 |
| JP | 2002514673 A | 5/2002 |
| JP | 2002285100 | 10/2002 |
| JP | 2002285100 A | 10/2002 |
| JP | 2003522817 A | 7/2003 |
| JP | 200418859 A | 1/2004 |
| JP | 2004018859 A | 1/2004 |
| JP | 2004211090 A | 7/2004 |
| JP | 2005-034687 A | 2/2005 |
| JP | 2005-505653 A | 2/2005 |
| JP | 2006-089743 A | 4/2006 |
| JP | 2011-099744 A | 5/2011 |
| JP | 2011-208371 A | 10/2011 |
| JP | 2013-091982 A | 5/2013 |
| JP | 2013-108339 A | 6/2013 |
| JP | 2013528670 A | 7/2013 |
| JP | 2014533948 A | 12/2014 |
| JP | 2015120769 A | 7/2015 |
| JP | 5910952 B2 | 4/2016 |
| KR | 100232793 B1 | 12/1999 |
| NL | 8203502 A | 4/1984 |
| RU | 2275403 C2 | 4/2006 |
| RU | 2346016 C2 | 2/2009 |
| RU | 2415167 C2 | 3/2011 |
| RU | 2484113 C2 | 6/2013 |
| RU | 2532909 C2 | 11/2014 |
| SG | 11201401321 W | 4/2013 |

(56) References Cited

FOREIGN PATENT DOCUMENTS

| | | | |
|---|---|---|---|
| SG | 11201401321 A | 8/2014 | |
| TW | 200613500 A | 5/2006 | |
| WO | 94017148 A | 8/1994 | |
| WO | 9641833 A1 | 12/1996 | |
| WO | 9914275 A1 | 3/1999 | |
| WO | 9914278 A1 | 3/1999 | |
| WO | 9914279 A1 | 3/1999 | |
| WO | 9958608 A1 | 11/1999 | |
| WO | 0004106 A1 | 1/2000 | |
| WO | 0112708 A1 | 2/2001 | |
| WO | 02053613 A1 | 7/2002 | |
| WO | 2003031502 A | 4/2003 | |
| WO | 03089479 A2 | 10/2003 | |
| WO | 2004035632 A2 | 4/2004 | |
| WO | 2005021672 A1 | 3/2005 | |
| WO | 2005048866 A2 | 6/2005 | |
| WO | 2005104694 A1 | 11/2005 | |
| WO | 2005104694 A2 | 11/2005 | |
| WO | 2006003044 A1 | 1/2006 | |
| WO | 2006074895 A1 | 7/2006 | |
| WO | 2006075000 A1 | 7/2006 | |
| WO | 2006081079 A1 | 8/2006 | |
| WO | 2007000335 A1 | 1/2007 | |
| WO | 2007002328 A1 | 1/2007 | |
| WO | 2007035255 A1 | 3/2007 | |
| WO | 2008070022 A1 | 6/2008 | |
| WO | 2008157468 A1 | 12/2008 | |
| WO | 2011124663 A1 | 10/2011 | |
| WO | 2011124664 A1 | 10/2011 | |
| WO | 2011124665 A1 | 10/2011 | |
| WO | 2012002095 A | 1/2012 | |
| WO | 2012168385 A2 | 12/2012 | |
| WO | 2012175622 A1 | 12/2012 | |
| WO | 2013050574 A1 | 4/2013 | |
| WO | 2013050622 A1 | 4/2013 | |
| WO | 2013050623 A1 | 4/2013 | |
| WO | 2013050624 A1 | 4/2013 | |
| WO | 2013071012 A2 | 5/2013 | |
| WO | 2014125589 A | 8/2014 | |
| WO | 2005021672 A1 | 10/2014 | |
| WO | 2014166880 A1 | 10/2014 | |
| WO | 2016054367 A1 | 4/2016 | |
| WO | 2016166334 A1 | 10/2016 | |
| WO | 2016166361 A1 | 10/2016 | |
| WO | 2016166365 A1 | 10/2016 | |
| WO | 2016166369 A1 | 10/2016 | |
| WO | 2016166371 A1 | 10/2016 | |
| WO | 2016166381 A1 | 10/2016 | |
| WO | 2016166382 A1 | 10/2016 | |
| WO | 2019145472 A1 | 8/2019 | |

OTHER PUBLICATIONS

"The Basics of Airless Spraying, Information on Basic Components, Spray Techniques and Safety", Graco, 2014.
Anonymus: "ETPPAAc Solutions Ethyltriphenylphosphonium Acid Acetate", Apr. 20, 2007, pp. 1-2.
Priority search report for EP10159253.3 completed on Mar. 10, 2011.
International Search Report and Written Opinion for PCT/EP2011/055463 dated May 30, 2011 and International Preliminary Report on Patentability (Ch. II) for PCT/EP2011/055463 completed on Jun. 25, 2012.
International Search Report and Written Opinion for PCT/EP2011/055464 dated Jun. 7, 2011 and International Preliminary Report on Patentability (Ch. II) for PCT/EP2011/055464 completed on Jun. 18, 2012.
International Search Report and Written Opinion for PCT/EP2011/055465 dated May 10, 2011 and International Preliminary Report on Patentability (Ch. II) for PCT/EP2011/055465 completed Jun. 18, 2012.
Priority search report for EP11184388.4 completed on Jul. 26, 2012, International Search Report and Written Opinion for PCT/EP2012/069798 dated Jan. 16, 2013 and International Preliminary Report on Patentability (Ch. I) for PCT/EP2012/069798 dated Apr. 8, 2014.
Priority search report for EP11184439.5 completed on Aug. 9, 2012. International Search Report and Written Opinion for PCT/EP2012/069906 dated Dec. 10, 2012 and International Preliminary Report on Patentability (Ch. I) for PCT/EP2012/069906 dated Apr. 8, 2014.
International Search Report and Written Opinion for PCT/EP2012/069904 dated Jan. 15, 2013 and International Preliminary Report on Patentability (Ch. I) for PCT/EP2012/069904 dated Apr. 8, 2014.
Priority search report for EP11184426.2 completed on Aug. 9, 2012, International Search Report and Written Opinion for PCT/EP2012/069905 dated Jan. 15, 2013 and International Preliminary Report on Patentability (Ch. II) for PCT/EP2012/069905 completed on Dec. 10, 2013.
Priority search report for EP13162819.0 completed on Feb. 19, 2014, International Search Report and Written Opinion for PCT/EP2014/056953 dated May 2, 2014 and International Preliminary Report on Patentability (Ch. I) for PCT/EP2014/056953 dated Oct. 13, 2015.
Priority search report for NL2014666 completed on Mar. 10, 2016, International Search Report and Written Opinion for PCT/EP2016/058427 dated Jul. 7, 2016 and International Preliminary Report on Patentability (Ch. I) for PCT/EP2016/058427 dated Oct. 17, 2017.
Priority search report for EP15169717.4 completed on Nov. 17, 2015.
International Search Report and Written Opinion for PCT/EP2016/058517 dated Aug. 1, 2016 and International Preliminary Report on Patentability (Ch. I) for PCT/EP2016/058517 dated Oct. 17, 2017.
International Search Report and Written Opinion for PCT/EP2016/058525 dated Jul. 13, 2016 and International Preliminary Report on Patentability (Ch. I) for PCT/EP2016/058525 dated Oct. 17, 2017.
International Search Report and Written Opinion for PCT/EP2016/058540 dated Jul. 18, 2016 and International Preliminary Report on Patentability (Ch. I) for PCT/EP2016/058540 dated Oct. 17, 2017.
Search report for NL2014667 completed on Feb. 11, 2016, with English machine translation.
Priority search report for EP15169719.0 completed on Nov. 3, 2015.
International Search Report and Written Opinion for PCT/EP2016/058588 dated Jul. 12, 2016 and International Preliminary Report on Patentability (Ch. I) for PCT/EP2016/058588 dated Oct. 17, 2017.
International Search Report and Written Opinion for PCT/EP2016/058590 dated Jul. 25, 2016 and International Preliminary Report on Patentability (Ch. I) for PCT/EP2016/058590 dated Oct. 17, 2017.
Priority search report for EP15169722.4 completed on Aug. 19, 2015 and International Search Report and Written Opinion for PCT/EP2016/058483 dated Jun. 9, 2016 and International Preliminary Report on Patentability (Ch. I) for PCT/EP2016/058483 dated Oct. 17, 2017.
Search report for NL2014668 completed on Feb. 11, 2016, with English machine translation.
U.S. Appl. No. 14/989,961 (now U.S. Pat. No. 9,587,138) filed Jan. 7, 2016 (parent filed Apr. 7, 2014).
JP Application No. 2014-533948 filed on Mar. 28, 2014 (effective filing date Oct. 8, 2012).
Brinkhuis, R.; Schutyser, J.; Thys, F.; De Wolf, E.; Buser, T.; Kalis, J.; Magnus, N.; Van Wijk, F. Taming the Michael Addition Reaction. European Coatings Journal 2015, 34-40. (Year: 2015).
T. Jung et al.—Farbe und Lacke Oct. 2003.
The International Search Report of PCT/EP2012/069904.
Braun, D. et al., Polymer Synthesis: Theory and Practice, 4th ed., 2005, pp. 64-66.
Noomen, Arie: "Applications of Michael addition chemistry in coatings technology", Progress in Organic Coatings, 32 (1997), pp. 137-142.
Krishnadas, Shashikiran et al., "Rapid Setting Epoxy Primer System with the Addition of Blocked Catalyst", Indian Journal of Advances in Chemical Science 2 (2014), pp. 55-60.
Lösungen, Römpp online 4.0, Mar. 1, 2002.
"The Basics of Airless Spraying, Information on Basic Components, Spray Techniques and Safety", 2014.
"ETPPAAc Solutions Ethyltriphenylphosphonium Acid Acetate", Apr. 20, 2007, pp. 1-2.

(56) References Cited

OTHER PUBLICATIONS

AZO Materials, "A_Guide_to_Silane_Solutions_Adhesives", Sep. 7, 2012, Internet Article, https://www.azom.com/article.aspx?ArticleID=6777.

* cited by examiner

PROCESS FOR THE MANUFACTURE OF A CROSSLINKABLE COMPOSITION

CROSS REFERENCE TO RELATED APPLICATIONS

This application is a 371 of PCT application number PCT/EP2016/058427 filed on Apr. 15, 2016, which claims priority from NL application number 2014666 filed on Apr. 17, 2015. Both applications are hereby incorporated by reference in their entireties.

BACKGROUND OF THE INVENTION

1. Field of the Invention

The invention relates generally to a process for the preparation of RMA crosslinkable compositions, in particular those compositions comprising at least one crosslinkable component comprising reactive components A and B each comprising at least 2 reactive groups wherein the at least 2 reactive groups of component A are acidic protons (C—H) in activated methylene or methine groups (the RMA donor group), and the at least 2 reactive groups of component B are activated unsaturated groups (C=C) (the RMA acceptor group), to achieve crosslinking by Real Michael Addition (RMA) reaction between said at least one crosslinkable component in the presence of a base catalyst (C) and an X—H group containing reactivity moderating component (D) that is also a Michael addition donor reactable with component B under the action of catalyst C, wherein X is C, N, P, O or S.

2. Description of the Related Art

The above mentioned compositions and preparation processes are described in EP2764035 from the same applicant. In particular a process for the preparation of the composition is described wherein the components A, B, D are mixed with catalyst C shortly before use. The mentioned prior art further describes a kit of parts comprising part 1 comprising components A and B and part 2 comprising component C and D or alternatively a part 1 comprising components A, B and D and part 2 comprising component C. The examples describe a process wherein all components are added together in an organic solvent and mixed or wherein catalyst component C is mixed in a solvent with component D and added to the other components.

BRIEF SUMMARY OF THE INVENTION

However, it has been found that the prior art process sometimes results in compositions with rather poorly reproducible reactivity profile, which translates into poorly reproducible open time, dry to touch time and hardness development. This makes it difficult to guarantee a high minimum pot life in practical use.

The problem underlying the invention is to provide a process for the preparation of RMA crosslinkable compositions comprising a reactivity promotor D which has at least one of the advantages of having better reproducible results in reactivity profile, open time, dry to touch time and hardness development preferably at low concentration of (volatile) organic solvent (low VOC) and preferably also at short mixing times that provide a better process capacity and economy.

According the invention this problem has been solved by a process for the preparation of a RMA crosslinkable composition comprising at least one crosslinkable component comprising reactive components A and B each comprising at least 2 reactive groups wherein the at least 2 reactive groups of component A are acidic protons C—H in activated methylene or methine groups and the at least 2 reactive groups of component B are activated unsaturated groups C=C and base catalyst C and one or more N—H group containing reactivity moderating components D that are also a Michael addition donor reactable with component B under the action of catalyst C, characterized in that the one or more reactivity moderating component D have a melting temperature above 60, 70, 80, or even 90° C. and is first dissolved in one or more crosslinkable components comprising reactive components A or B and the obtained pre-dissolved product is later mixed with other components of the RMA crosslinkable composition.

The inventors have found out that the problem occurs because the dissolution of the solid reactivity moderator D of the type having N—H acidic groups and having a melting temperature above 60, 70, 80, or even 90° C. is not complete. A solution to that problem could be to use considerably higher amounts of organic solvent. However, that would increase the VOC, which is undesirable from the viewpoint of cost and QESH but also because a high organic solvent content requirement results in lower viscosity and thus prevents the use of the composition in applications where a relatively high viscosity is desired or possible.

The process of the invention has a distinct advantage over dissolving in special high boiling solvents as these are not preferred solvents in RMA crosslinkable composition because they do not evaporate from the coating and so deteriorate the coating properties. A particular preferred solvent for RMA crosslinkable composition (for several reasons) is MEK but solubility of reactivity moderators, in particular succinimide in MEK is poor. Extensive grinding may be a way to improve solubility but this does not work too well, requires special equipment that is not available for all users and in any case adds to production costs.

It is preferred that component D is dissolved in the one or more crosslinkable component comprising reactive components A or B at a temperature above its melting temperature. It is preferred to dissolve D in crosslinkable component comprising reactive components A so that the reactive groups in the crosslinkable component A are similar to the reactive groups in D and both reactable with component B so there is no or less risk of side reaction at elevated temperatures, in particular compared to dissolving in component B.

It is found that the melting of the moderator in the presence of the crosslinkable components, in particular polymer, not only accelerates the dissolution but also stabilizes the solution after the cooling. The moderator may be hindered by the presence of the polymer to crystallise again. The obtained mixture of crosslinkable components and moderator can be easily compounded with the other composition components. It has been found that no moderator D crystallization takes place in the RMA coating composition. The compositions have a good long shelf life.

A suitable way of preparing the solution of the moderator and the crosslinkable components is simply by providing the moderator D and the crosslinkable components, heating at least the moderator to a temperature above the melting temperature of the moderator D and mixing it with the crosslinkable components. As the mount of moderator is relatively small it is more easy to add and mix the solid particulate moderator D to the crosslinkable components that are at a temperature above the melting temperature of the moderator component D and mixed.

In a particularly preferred embodiment of the process, the moderator D is added directly after the synthesis of a polymeric crosslinkable components while they are still at high temperature. In that process the crosslinkable component is a polymer comprising reactive component A or B or both which is synthesised at a temperature above the melting temperature of component D and wherein component D is added directly after the synthesis of said polymer and dissolved therein before cooling to a temperature below the melting temperature of the component D. Herein the crosslinkable component is for example and preferably a polyester comprising reactive components A which is synthesised by forming a polyester polymer using reactive component A as monomer or by transesterification of polyester polymer with a reactive component A. This embodiment provides a cost effective and very efficient way without significant expense or effort to prepare a stable and homogeneous solution of the moderator D which can be used for preparation of the RMA crosslinkable composition. Melting temperatures of components D are reported in literature and suitable solid particulate moderators D can be chosen on the basis of their melting temperature in relation with the envisaged synthesis process The invention also relates to a solution of moderator D having a melting temperature above 60 C in RMA crosslinkable polymer components as herein described and obtainable by the described preparation processes and its use in the preparation of RMA crosslinkable compositions.

Suitable polymeric crosslinkable components are chosen from the group of polyesters, polyurethanes, polyacrylates, epoxy resins, polyamides and polyvinyl resins which contains components A or B or both in the main chain, pendant, terminal or combinations thereof. The crosslinkable components preferably have a weight average molecular weight Mw of at least 250 gr/mol, preferably a polymer having Mw between 250 and 5000, more preferably between 400 and 4000 or 500 and 3000 gr/mol.

As described in the above mentioned prior art it is preferred that the reactive component A is malonate or acetoacetate and reactive component B is acryloyl. The N—H group in component D preferably has a pKa (defined in aqueous environment) of at least one unit, preferably two units, less than that of the C—H groups in component A, preferably the pKa of the N—H group in component D is lower than 13, preferable lower than 12, more preferably lower than 11, most preferably lower than 10; it is preferably higher than 7, more preferably 8, more preferably higher than 8.5. Thus the moderator will react first with the RMA acceptor in reactive component B and hence slow down the reaction with crosslinkable component A.

The process component D may contain the N—H as part of a group —(C=O)—NH—(C=O)—, or of a group —NH—(O=S=O)— or a heterocycle in which the nitrogen of the N—H group is contained in a heterocyclic ring. Preferably the component D is chosen from the group of an substituted or unsubstituted succinimide, phthalimide, glutarimide, hydantoin, triazole, pyrazole, imidazole or uracil or a mixture thereof, preferably chosen from the group of (mixtures of) succinimides and triazoles.

The component D is preferably present in an amount between 0.1 and 10 wt %, preferably 0.2 and 7 wt %, 0.2 and 5 wt %, 0.2 and 3 wt %, more preferably 0.5 and 2 wt % relative to the total amount of the crosslinkable components A or B and component D and is present in such amount that the amount of N—H groups in component D is no more than 30 mole %, preferably no more than 20, more preferably no more than 10, most preferably no more than 5 mole % relative to C—H donor groups from component A present in the crosslinkable polymer.

The invention also relates to a crosslinkable composition obtainable by the process according to the invention having without additional solvent removal steps, an amount of volatile organic components of no more than 300, preferably no more than 200, 175 or 150 gr/ltr and to the use of such a coating composition having a volatile organic components content of no more than 300, preferably no more than 200, 175 or 150 gr/ltr in an airless spraying application process.

The invention also relates to a coating composition comprising the crosslinking composition according to the invention and one or more coating additives like pigments, co-binders, diluents. High solid contents are desired and diluents are added only for achieving desired handling properties like spray viscosity.

As described the invention also relates to a moderator composition for use in a process for the preparation of an RMA crosslinkable composition according to the invention comprising a N—H group containing reactivity moderating component D having a melting temperature above 60, 70, 80, or even 90° C. dissolved in one or more RMA crosslinkable components comprising reactive components A or B, not comprising catalyst C, in particular a moderator composition consisting essentially of a polymer with malonate as reactive components, between 1 and 2 wt % of a dissolved succinimide or a triazole moderator and less than 300, preferably no more than 200, 175 or 150 gr/ltr of an organic solvent.

The RMA composition is characterized by an excellent combination of long pot-life with high curing reactivity and speed, but the potlife is not so long that the mentioned parts can be sold in admixture. Therefore the RMA crosslinkable composition is prepared shortly before use by mixing a first part comprising the moderator composition comprising moderator D and the crosslinkable components comprising reactive components A and/or B, a second part comprising the catalyst C and optional third and further parts comprising all other remaining RMA components and additives. The invention therefore also relates to a kit of parts comprising a first part comprising the moderator composition and a second part comprising catalyst C and optional further parts comprising remaining components of the RMA composition and additives

DETAILED DESCRIPTION OF THE INVENTION

Reference is made to EP2764035 for detailed description of all components A, B C or D, their preparation, the amounts used in the RMA crosslinkable composition as well as for measurement methods and definitions and is hereby incorporated by reference.

Crosslinkable components can be monomers or polymers having 2 or more reactive groups for crosslinking. Polymers are considered to be compounds having at least 2 repeat units and typically have a weight average molecular weight (determined by GPC) of more than 250 gr/mol. The upper limit can be as high as 100000 or 200000 but for the application as coating resin the RMA crosslinkable compositions in view of viscosity are preferably between 250 (preferably 300, 400 or 500) and 5000 (preferably 4500 or 4000) gr/mol (GPC). The reactive components A and B can be pending, terminal or build into a polymer chain.

Monomeric compounds can also be used as crosslinkable components A or B. For example diethylmalonate has 2 C—H groups that can react and hence can be used as crosslinkable component A. Trimethylolpropane triacrylate (TMPTA) has only one repeat unit but 3 reactive C═C groups for crosslinking. These monomer components A or B or mixtures thereof can react to form an RMA crosslinked network and can also be used as reactive diluents together with polymeric crosslinkable components comprising A, B or both to replace organic solvent and reduce VOC of the RMA crosslinkable composition. Optionally also monomer components A or B can be included in the RMA composition that have only 1 RMA reactive C—H or C═C group.

Preferred crosslinkable components are A group containing polymers such as, for example, polyesters, polyurethanes, polyacrylates, epoxy resins, polyamides and polyvinyl resins containing groups A in the main chain, pendant or both. Component A preferably is malonate or acetoacetate. Components containing both malonate and acetoacetate groups in the same molecule are also suitable. Additionally, physical mixtures of malonate and acetoacetate group-containing components are suitable. The RMA reactive donor components A preferably predominantly originate are malonate groups, i.e. more than 50%, 75% or even 90% of reactive components A are malonate groups.

Reactive component B generally can be ethylenically unsaturated components in which the carbon-carbon double bond is activated by an electron-withdrawing group, e.g. a carbonyl group in the alpha-position. Suitable components B are known in the art, for example acryloyl esters, acrylamides, alternatively polyesters based upon maleic, fumaric and/or itaconic acid (and maleic and itaconic anhydride and polyesters, polyurethanes, polyethers and/or alkyd resins containing pendant activated unsaturated groups. Acrylates, fumarates and maleates are preferred. Most preferably, the component B is an unsaturated acryloyl functional component. Further preferences regarding the crosslinkable component comprising reactive component B are described in EP2764035.

Typically, the concentrations of the functional groups in components A and B, and their relative stoichiometry, are chosen such that good film properties following cure may be expected, with efficient use of these functional groups. Typically, stoichiometries C═C/C—H are chosen to be from 0.1 to 10, preferably 0.5 to 3, more preferably 0.7 to 3, most preferably 0.8/1.5. For this ratio, the N—H of component D is added to the C—H groups of component A.

The base catalyst C can in principle be any known catalyst suitable for catalyzing RMA reactions. Preferably, in view of achieving good pot-life in combination with low temperature curing, the cross-linking composition comprises a catalyst system C comprising a strong based blocked by a volatile acid which is activated by evaporation of this acid. A suitable catalyst system C comprises a strong based blocked by a carbon dioxide, or the blocked catalytic species are of formula ROCO2-, R being an optionally substituted alkyl, preferably C1-C4 radical or hydrogen, preferably the catalyst comprises a blocked base anion and a quaternary ammonium or phosphonium cation. It is preferred that the crosslinking catalyst is utilized in an amount ranging between 0.001 and 0.3 meq/g solids, preferably between 0.01 and 0.2 meq/g solids, more preferably between 0.02 and 0.1 meq/g solids (meq/g solids defined as m moles base relative to the total dry weight of the crosslinkable composition, not counting particulate fillers or pigments). Further preferences regarding the crosslinkable component comprising reactive component C are described in EP2764035

The crosslinking composition can comprise a solvent, preferably an organic solvent. For CO2 deblocking catalyst systems, the inventors further found that advantages can be achieved in pot life if in the crosslinkable composition at least part of the solvent is a primary alcohol solvent. The solvent can be a mixture of a non-alcoholic solvent and an alcohol solvent.

In summary the crosslinkable composition according to the invention comprises between 5 and 95 wt % of a crosslinkable component, preferably said polymeric component, comprising reactive component A with at least 2 acidic protons C—H in activated methylene or methine, and between 5 and 95 wt % of a crosslinkable component, preferably a low molecular weight component, comprising reactive component B with at least 2 activated unsaturated groups (wt % relative to the total weight of the crosslinkable composition) and a catalyst system C that contains, or is able to generate a basic catalyst capable of activating the RMA reaction between components A and B, at levels of 0.0001 and 0.5 meq/g solid components, wherein component D is present in quantities of at least 10, 20, 30, 40 or maybe even 50 mole % relative to base catalyst component C or base generated by catalyst component C, and preferably less than 30 mole % of C—H active groups from component A optionally a sag control agent (SCA), optionally between 0.1 and 80 wt % of solvent (preferably less than 45 wt %), preferably containing at least 1 wt % of a primary alcohol, optionally at least 0.2 wt % water.

The crosslinkable composition typically and preferably is a 2K composition which is only formed shortly before the actual use, the invention also relates to a kit of parts for the manufacture of the composition according to the invention comprising a part 1 and part 2 wherein one part comprises the catalyst and the other does not comprise the catalyst C.

The composition of the invention comprises component D as an additive for the improvement of the open time of the crosslinkable composition and for the improvement of the appearance and hardness of the resulting cured composition, in particular a coating.

The N—H group in component D has a higher acidity than the C—H groups in component A, preferably being characterized in that component D has a pKa (defined in aqueous environment) of at least one unit, preferably two units, less than that of component A. Preferably the pKa of the N—H group in component D is lower than 13, preferable lower than 12, more preferably lower than 11 most preferably lower than 10. An excessive acidity may create problems with components in the catalyst system; therefore hence the pKa is preferably higher than 7, more preferably 8, more preferably higher than 8.5. The acidity difference assures that on application of the coating, component D is activated (deprotonated) preferentially over component A.

In the cross-linking composition, the N—H groups in component D are present in an amount corresponding to at least 10, 20, 30 40, or even 50 mole %, preferable at least 100 mole %, most preferably at least 150 mole % relative to the amount of base to be generated by catalyst C. The appropriate amount is very much determined by the acid base characteristics of component D relative to component A, and the reactivity of the corresponding anions relative to B, so may vary for different systems. Typically the N—H groups in component D are present in an amount corresponding to no more than 30 mole %, preferably no more than 20, more preferably no more than 10, most preferably no more than 5 mole % relative to C—H donor groups from component A. Preferably, the N—H functionality (number of groups per molecule) of component D is low, preferably less than 4, more preferably less than 2, most preferably it is 1.

The invention also relates to crosslinkable composition obtainable according to the invention. This composition can be used to prepare a paint composition.

EXAMPLES

The following is a description of certain embodiments of the invention, given by way of example only and with reference to the drawings.

Example 1

The malonate functional resin PE is a polyester resin which has been trans-esterified with diethylmalonate. This resin is prepared as follows: Into a reactor provided with a distilling column filed with Raschig rings were brought 382 g of neopentyl glycol, 262.8 g of hexahydrophthalic anhydride and 0.2 g of butyl stannoic acid. The mixture was polymerised at 240° C. under nitrogen to an acid value of 0.2 mg KOH/g. The mixture was cooled down to 130° C. and 355 g of diethylmalonate was added. The reaction mixture was heated to 170° C. and ethanol was removed under reduced pressure. When the viscosity at 100° C. reached 0.5 Pa·s the material was cooled down to 140° and 11.2 grams of solid succinimide were added. This mixture was stirred until all succinimide was dissolved. The resin was further cooled and diluted with butyl acetate to 85% solids. After 6 month of storage at 4° C. no precipitate was formed.

Examples of a paint formulation (i.e. a coating composition) are given below and are based on DTMPTA (di-trimethylolpropane tetra acrylate) as acryloyl acceptor (Miramer M410 mentioned in Table 1 is DTMPTA). The catalyst used is a mixture of tetra-butyl ammonium bicarbonate, diethylcarbonate and n-propanol with a concentration of 0.928 meq/g.

Example 2

Formulation 1 was prepared as described in Table 1, using the succinimide containing resin as described in example 1. After pre-dissolving the 1,2,4-triazole in n-propanol, only liquid materials needed to be mixed. The resulting paint was applied on a metal panel with a dry film thickness of 60 μm, giving the results as described in Table 2, showing that this paint performed similarly compared to paints containing succinimide dissolved in n-propanol and butyl acetate as solvent.

Example 3

Example 2 was repeated, but then after aging the succinimide modified resin for 6 months at room temperature. Similar results were obtained (Table 2).

Comparative Example 1

Formulation 2 was prepared according to Table 1. Here, 2.3 grams of succinimide was dissolved along with 5.1 grams of 1,2,4-triazole in 65.6 grams of n-propanol and 43.7 grams of butyl acetate using an ultrasonic bath for 30 minutes. The resulting paint was applied on a metal panel, giving the results as described in Table 2.

Comparative Example 2

Formulation 2 was prepared according to Table 1. Here, 2.3 grams of succinimide was dissolved along with 5.1 grams of 1,2,4-triazole in 65.6 grams of n-propanol and 43.7 grams of butyl acetate by magnetic stirring overnight. The resulting paint was applied on a metal panel, giving the results as described in Table 2.

TABLE 1

| Component | Formulation 1 | Formulation 2 |
|---|---|---|
| Part 1 | | |
| Malonate functional PE | 139.4 | 328.9 |
| Succinimide containing malonate functional PE | 192.2 | 0 |
| Pigment paste* | 565.5 | 565.5 |
| Pre-dissolve: | | |
| Succinimide | 0 | 2.3 |
| 1,2,4-triazole | 4.8 | 4.8 |
| Butyl acetate | 0 | 40.0 |
| n-propanol | 27.0 | 65.9 |
| Subsequently add | | |
| Byk 310:315 1:4 | 2.8 | 2.8 |
| Tinuvin 292 | 4.6 | 4.6 |
| Part 2 | | |
| catalyst | 24.9 | 24.9 |
| n-propanol | 38.9 | |
| Dilute to spray viscosity | | |
| Butyl acetate | 55.3 | 15.7 |

*mix 32.0% of Miramer M410 with 65.1% of Kronos 2310 and 2.9% of disperbyk 163 and grind until the particle size is smaller than 10 μm

TABLE 2

| | Ex. 2 | Ex. 3 | Comp. Ex. 1 | Comp. Ex. 2 |
|---|---|---|---|---|
| Drying time (min) | 40 | 39 | 43 | 37 |
| Persoz hardness (60 μm, after 1 day) | 167 | 175 | 173 | 170 |
| Gloss at 60° | 90 | 90 | 90 | 90 |
| Haze | 9 | 10 | 11 | 9 |
| VOC of Part 1 (g/L) | 121 | 121 | 222 | 222 |

The examples illustrate the advantages of the invention:

1) There is no need any more for time consuming and elaborate dissolving of component D in solvents. Instead, 2 liquid resins can simply and quickly be mixed.

2) Because the solid component D does not need to be dissolved any more, less solvent is needed in the A-component of the paint (Part 1 in Table 1). Instead, the ratio of part 1 and part 2 can be adapted more flexibly. This is relevant for application where the mixing ratio between part 1 and part 2 can be critical. Alternatively, the paint could be diluted to higher spray viscosities. In this way, the invention contributes to decreasing the VOC of the paint. The invention therefore also relates to crosslinkable composition obtainable according to the process of the invention, in particular to low VOC compositions.

Thus, the invention has been described by reference to certain embodiments discussed above. It will be recognized that these embodiments are susceptible to various modifications and alternative forms well known to those of skill in the art. For example, the succinimide may be any component D, in particular any N—H acidic component having a low solubility in organic solvents, in particular triazoles or imides. Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A process for the preparation of a RMA crosslinkable composition comprising at least one crosslinkable component comprising reactive components A and B each comprising at least 2 reactive groups wherein the at least 2 reactive groups of component A are acidic protons C—H in activated methylene or methine groups and the at least 2 reactive groups of component B are activated unsaturated groups C=C and base catalyst C and one or more N—H group containing reactivity moderating component D that are also a Michael addition donor reactable with component B under the action of catalyst C, characterized in that the one or more reactivity moderating components D have a melting temperature above 60° C. and is first dissolved in one or more crosslinkable components comprising reactive components A or B and the obtained pre-dissolved product is later mixed with other components of the RMA crosslinkable composition and wherein component D is dissolved in the one or more crosslinkable component comprising reactive components A or B at a temperature above its melting temperature.

2. The process of claim 1, wherein component D is dissolved in the one or more crosslinkable component comprising reactive components A at a temperature above the melting temperature of reactivity moderating component D.

3. The process of claim 1, wherein the crosslinkable component is a polymer chosen from the group of polyesters, polyurethanes, polyacrylates, epoxy resins, polyamides and polyvinyl resins, which contains reactive components A or B in the main chain, pendant, terminal or combinations thereof.

4. The process of claim 1, wherein the crosslinkable components are polymeric components with a weight average molecular weight Mw of at least 250 gr/mol.

5. The process of claim 1, wherein the crosslinkable component is a polymer comprising reactive component A or B or both and is synthesised at a temperature above the melting temperature of component D and wherein component D is added directly after the synthesis of said polymer and dissolved therein before cooling to a temperature below the melting temperature of the component D.

6. The process of claim 5, wherein the crosslinkable component is a polyester comprising reactive components A which is synthesised by forming a polyester polymer using reactive component A as monomer or by transesterification of polyester polymer with a reactive component A.

7. The process of claim 1, wherein reactive component A is malonate or acetoacetate and reactive component B is acryloyl.

8. The process of claim 1, wherein the N—H group in component D has a pKa (defined in aqueous environment) of at least one unit less than that of the C—H groups in component A.

9. The process of claim 1, wherein the pKa of the N—H group in component D is lower than 13.

10. The process of claim 1, wherein component D comprises a molecule containing the N—H as part of a group —(C=O)—NH—(C=O)—, or of a group —NH—(O=S=O)— or a heterocycle in which the nitrogen of the N—H group is contained in a heterocyclic ring.

11. The process of claim 1, wherein component D is selected from the group consisting of a substituted or unsubstituted succinimide, phthalimide, glutarimide, hydantoin, triazole, pyrazole, imidazole and uracil or mixtures thereof.

12. The process of claim 1, wherein component D is present in an amount between 0.1 and 10 wt %, relative to the total amount of component D and the amount of the one or more crosslinkable components comprising reactive component A or B.

13. The process of claim 1, wherein component D is present in such amount that the amount of N—H groups in component D is no more than 30 mole %, relative to C—H donor groups from component A present in the crosslinkable polymer.

* * * * *